(No Model.) 2 Sheets—Sheet 1.
B. F. TREMBLY.
REEL CARRIER.
No. 565,054. Patented Aug. 4, 1896.
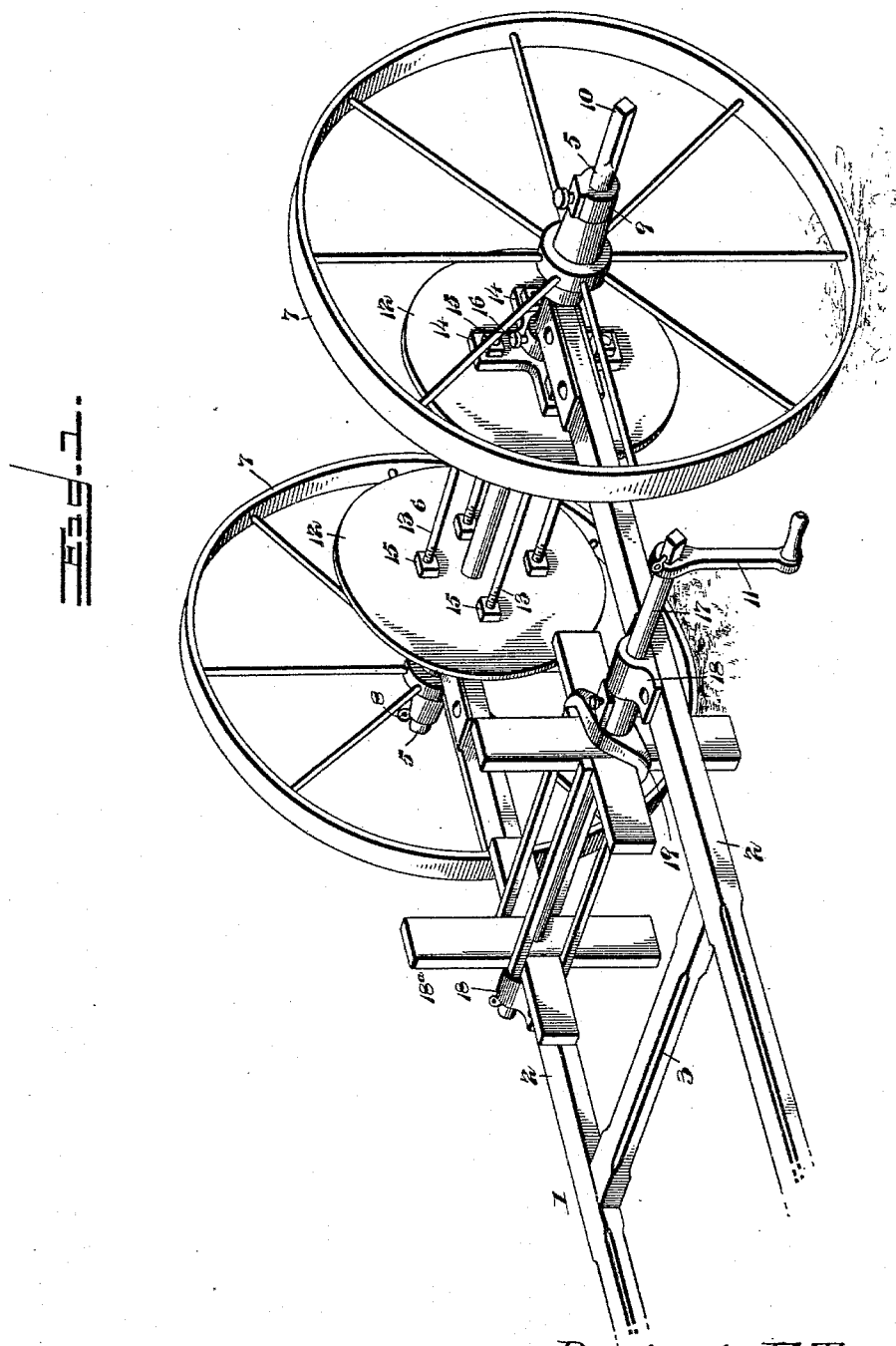
Witnesses
E. N. Stewart
J. F. Riley
Inventor
Benjamin F. Trembly
By his Attorneys,
C. A. Snow & Co.

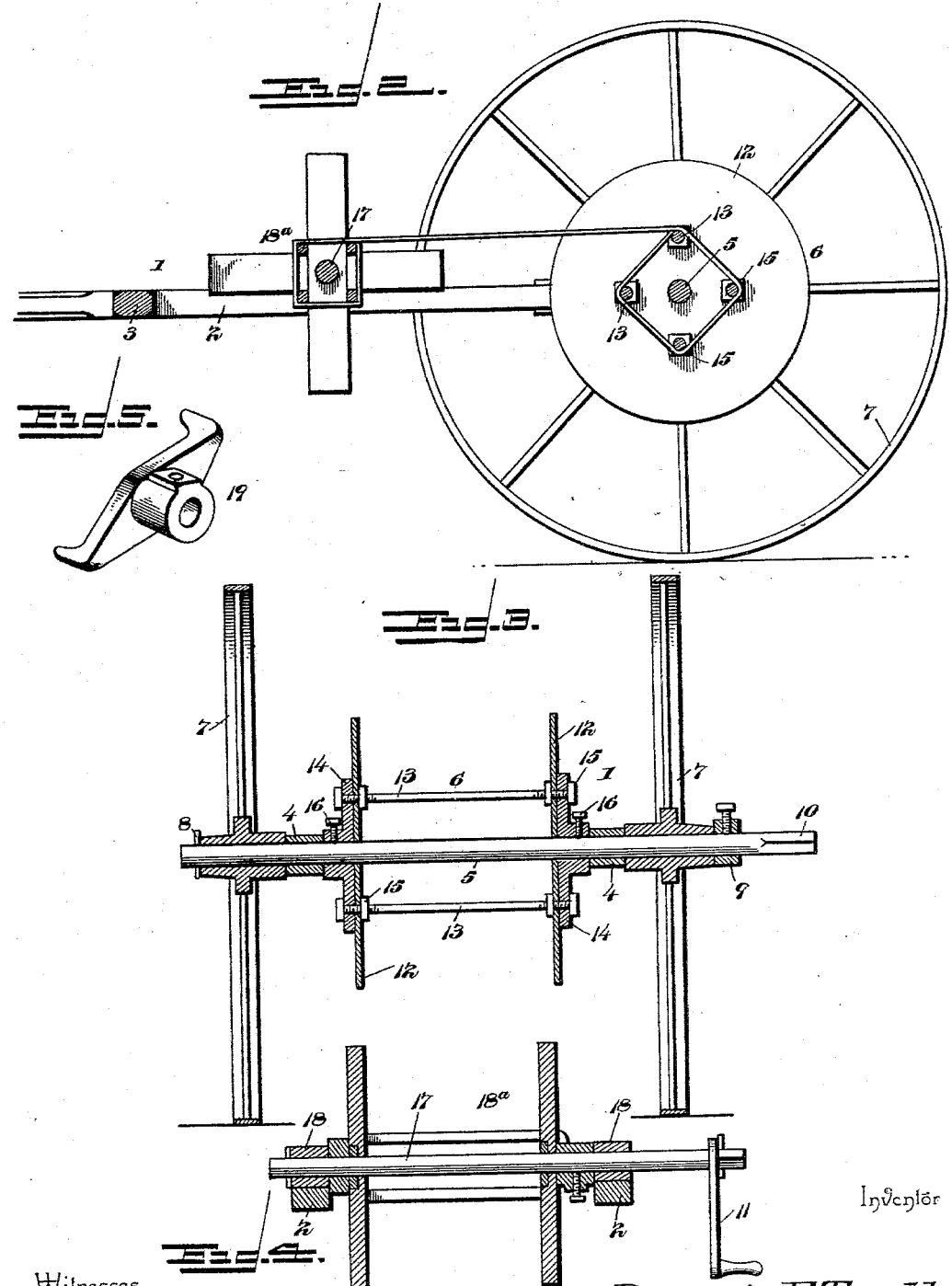

UNITED STATES PATENT OFFICE.

BENJAMIN F. TREMBLY, OF HOLDEN, MISSOURI.

REEL-CARRIER.

SPECIFICATION forming part of Letters Patent No. 565,054, dated August 4, 1896.

Application filed July 2, 1895. Serial No. 554,747. (No model.)

*To all whom it may concern:*

Be it known that I, BENJAMIN F. TREMBLY, a citizen of the United States, residing at Holden, in the county of Johnson and State of Missouri, have invented a new and useful Reel-Carrier, of which the following is a specification.

The invention relates to improvements in reel-carriers.

The object of the present invention is to improve the construction of reel-carriers, and to provide a simple and inexpensive one, which will enable, in removing a fence, the wire to be readily gathered up and conveniently transferred to the ordinary construction of wire-receiving spools.

The invention consists in the construction and novel combination and arrangement of parts hereinafter fully described, illustrated in the accompanying drawings, and pointed out in the claims hereto appended.

In the drawings, Figure 1 is a perspective view of a reel-carrier constructed in accordance with this invention. Fig. 2 is a longitudinal sectional view. Fig. 3 is a transverse sectional view taken longitudinally of the axle. Fig. 4 is a similar view taken longitudinally of the spool-shaft. Fig. 5 is a detail sectional view of the clamp of the removable spool.

Like numerals of reference indicate corresponding parts in all the figures of the drawings.

1 designates a substantially rectangular frame, composed of similar sides or shafts 2, connected intermediate of their ends by a transverse bar 3, and having their front portions in advance of the latter, forming a pair of shafts or thills to receive a draft-animal. The sides of the frame are provided at their rear ends with bearings 4, receiving a rotating axle or shaft 5, carrying a permanently-mounted spool 6, and having journaled on it at opposite sides of the frame carrying-wheels 7.

The carrying-wheels 7 rotate freely on the axle 5, and are removably arranged thereon by any suitable means, such as a key 8 and a collar 9, provided with a clamping-screw.

One end of the axle is extended beyond the adjacent wheel, and has a squared or polygonal portion 10, adapted to receive a crank-handle 11, for rotating the shaft or axle, to produce a corresponding rotation of the spool 6, to enable wire lying on the ground to be wound on the latter as the reel-carrier moves forward. The spool or reel 6 is composed of circular side plates 12 and transverse connecting-rods 13, which are preferably four in number, and which form the center of the spool for the reception of the wire. The ends of the rods 13, which are arranged in the form of a rectangle, are threaded and pass through perforations of the side plates 12 and registering perforations of arms of spiders 14, and receive nuts 15, located on the inner faces of the sides of the spool or reel and on the outer faces of the arms of the spider.

The spiders consist, preferably, of castings having central openings to receive the axle or shaft, and provided with clamping-screws 16, whereby the reel or spool is rigidly and detachably mounted on the shaft or axle. The nuts being located at the inner and outer faces of the sides of the spool or reel firmly clamp the parts together and form a rigid structure.

A spool-shaft 17 is journaled in suitable bearings 18 of the sides 2 of the frame, and is located in advance of the carrying-wheels and the reel or main spool, and is adapted to receive an ordinary wire-receiving spool $18^a$, which is held rigid with the shaft by a clamp 19. The clamp 19 is provided with an opening to receive the spool-shaft 17, and has a clamping-screw for engaging the same, and is provided with substantially L-shaped arms for engaging the spool. The clamping-screw of the clamp also removably retains the shaft 17 in its bearings.

The shaft 17 is extended at one side of the frame and has a squared or polygonal portion for the reception of the crank-handle 11, which may be readily transferred from the spool-shaft to the axle, as desired. After one spool $18^a$ has been filled, another may be readily placed on the shaft 17, and the wire of the main spool or reel may be quickly transferred from the main spool or reel to spools $18^a$.

The permanently-mounted spool presents smooth faces and edges to the wire, and the latter can be more rapidly gathered after it has been detached from posts than is the case when it is wound on an ordinary spool 18ª, as the wire is liable to catch on the ends of the arms, and care has to be exercised in guiding it to the spool. After the permanently-mounted spool is filled with wire, if the latter is to be transferred to another place for immediately building a fence, it is moved to such place and unreeled directly therefrom; but if it is desired to store the wire and house it from the weather it is reeled on the ordinary commercial spools 18ª. The wire can also, in fence-building, be unreeled from the ordinary commercial spools by placing them on the shaft 17.

It will be seen that the reel-carrier is simple and inexpensive in construction, that it enables barbed wire and other kinds of fencing-wire to be readily handled, and that in taking down and removing a fence the wire thereof may be readily gathered up and transferred to the ordinary form of spools.

Changes in the form, proportion, and the minor details of construction may be resorted to without departing from the principle or sacrificing any of the advantages of this invention.

What I claim is—

1. The combination of a pair of shafts, an axle journaled on the shafts at the rear ends thereof, wheels journaled on the axle and adapted to rotate independently thereof, a permanently-mounted spool fixed to the axle, and presenting smooth faces and edges to the wire a transverse shaft journaled on the said shafts and located in advance of the wheels, and a spool detachably mounted on the transverse shaft and adapted to receive wire from the permanently-mounted spool and capable of being readily removed after it has been filled, in order that it may be replaced by an empty spool, substantially as and for the purpose described.

2. A spool, comprising opposite sides having central openings and provided with perforations, transverse rods connecting the sides and arranged in the perforations thereof and having their ends threaded, inner nuts located on the rods at the inner faces of the sides, the spiders having central openings and provided with arms having perforations receiving the rods, nuts arranged on the rods and located at the outer faces of the spiders, and means for securing the spool on a shaft or axle, substantially as described.

In testimony that I claim the foregoing as my own I have hereto affixed my signature in the presence of two witnesses.

BENJAMIN F. TREMBLY.

Witnesses:
MARTIN V. HOLDER,
CHAS. D. STILL.